(12) United States Patent
Hammond et al.

(10) Patent No.: US 8,022,109 B2
(45) Date of Patent: Sep. 20, 2011

(54) PRODUCT FILTRATION SYSTEM FOR SLURRY REACTORS

(75) Inventors: David G. Hammond, Fairfax, VA (US); David C. Long, Ashburn, VA (US); Paul K. Ladwig, Centreville, VA (US); Min Chang, McLean, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 82 days.

(21) Appl. No.: 12/592,167

(22) Filed: Nov. 20, 2009

(65) Prior Publication Data

US 2010/0160459 A1    Jun. 24, 2010

Related U.S. Application Data

(60) Provisional application No. 61/203,526, filed on Dec. 23, 2008.

(51) Int. Cl.
| | |
|---|---|
| *C07C 27/00* | (2006.01) |
| *B01D 33/00* | (2006.01) |
| *B01D 29/07* | (2006.01) |
| *B01D 61/00* | (2006.01) |

(52) U.S. Cl. ......... 518/728; 210/331; 210/499; 210/650

(58) Field of Classification Search .................. 518/728; 210/331, 650, 499
See application file for complete search history.

(56) References Cited

U.S. PATENT DOCUMENTS

| | | |
|---|---|---|
| 4,439,327 A | 3/1984 | Muller |
| 5,599,849 A | 2/1997 | Jager et al. |
| 5,770,629 A | 6/1998 | Degeorge et al. |
| 5,811,469 A | 9/1998 | Leviness et al. |
| 2001/0039298 A1 | 11/2001 | Degeorge et al. |
| 2002/0128330 A1 | 9/2002 | Anderson |
| 2003/0232894 A1 | 12/2003 | Mohedas et al. |
| 2004/0235966 A1 | 11/2004 | Bhatt et al. |

FOREIGN PATENT DOCUMENTS

| | | |
|---|---|---|
| FR | 2877950 A | 5/2006 |
| WO | WO 2005/005038 A1 | 1/2005 |
| WO | WO 2005/084791 A1 | 9/2005 |
| WO | WO 2007/079031 A1 | 7/2007 |
| WO | WO 2008/146239 A2 | 12/2008 |

*Primary Examiner* — Jafar Parsa

(57) ABSTRACT

A filter system for use in a three-phase slurry reactor is provided. The filter system comprises one or more bundles of a plurality of filter elements for separating liquid from a mixture of liquid and solids contained in the reactor. Each filter bundle is connected to a product transfer conduit transporting separated liquid to a location outside of and downstream from the reactor. The transfer conduit is provided with means for backflushing the filter bundle and guard filter means.

7 Claims, 2 Drawing Sheets

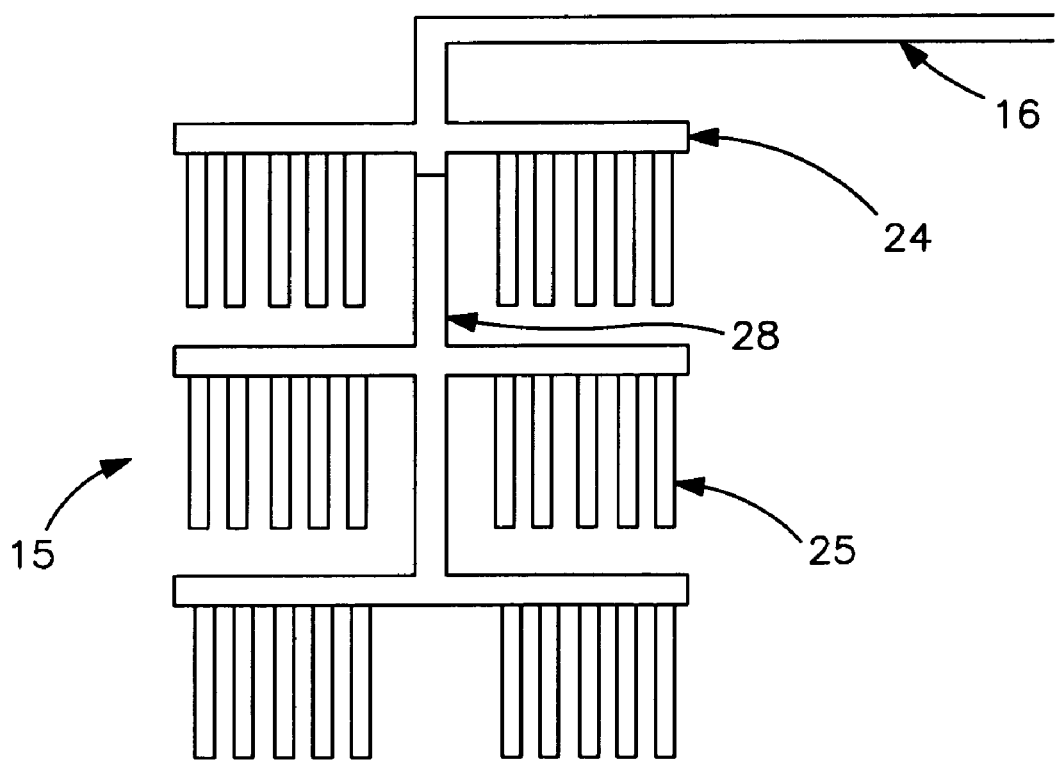

PRODUCT FILTRATION SYSTEM FOR SLURRY REACTORS

Non-Provisional Application based on Provisional Application No. 61/203,526 filed Dec. 23, 2008.

FIELD OF THE INVENTION

The present invention relates to a filter system for use in a slurry reactor. More particularly, the invention relates to a filter system for separating liquid hydrocarbons from solid catalyst particles in a three-phase slurry reactor that is provided with a filter failure detection means.

BACKGROUND OF THE INVENTION

Three-phase slurry processes are known in the art. These processes are highly exothermic catalytic reactions. Basically, the three phases comprise a liquid phase in which solid catalyst particles are dispersed by a gas phase bubbling through the liquid phase. A typical three-phase slurry process is the Fischer-Tropsch hydrocarbon synthesis process in which synthesis gas, i.e., a mixture of hydrogen and carbon monoxide, is contacted with a catalyst dispersed in a hydrocarbon liquid. The catalyst used usually is a Group VIII metal catalyst supported on a catalyst carrier. Most of the hydrocarbons produced in this process are liquids under reaction conditions and need to be removed from the slurry reactor for further processing and upgrading to the desired end products.

In carrying out a three-phase slurry process, such as the Fischer-Tropsch hydrocarbon synthesis process, it is important to keep the catalyst and liquid inventory in the reactor vessel substantially constant. Thus, it is necessary to be able to separate liquid product from the catalyst and remove it from the reactor.

Various filtration schemes have been proposed to separate liquid, especially liquid hydrocarbon reaction products produced in a Fischer-Tropsch reaction, from the slurry in a three-phase slurry reactor. Some involve the use of filter elements located within the slurry reactor. Examples of these include U.S. Pat. No. 5,599,849, WO 2005/084791 A1, and US Patent Publications 2001/0039298 A1 and 2002/0128330 A1.

Other schemes involved the use of external filter systems. Examples of these include U.S. Pat. No. 5,770,629 and US Patent Publication 2003/0232894 A1.

Filtration systems that may be used within or outside of the slurry reactor are exemplified by U.S. Pat. No. 5,811,469 and US Patent Publication 2004/0235966 A1.

One problem with filtering systems such as described above is the build-up of catalyst particles on the filter which results in a decrease in the filter rate. Typically, the catalyst build-up is removed by periodic backflushing of the filter elements. Thus, for example, a surge vessel for backflushing is operably connected to one or more banks of filter elements via a common conduit. Valves may be provided, such as described in U.S. Pat. No. 5,599,849, for isolating individual banks of filter elements from the common conduit. This permits backflushing of individual banks of filter elements one at a time.

A key issue not addressed by the foregoing references is the need to protect downstream equipment from a potential mechanical failure of any of the many filter elements or piping connections located in the reactor. In a larger reactor, there may be thousands of filter elements, making it virtually impossible to guarantee complete system integrity for an extended run. The consequence of even a small leak in the filter system is a significant degradation of product quality, and loss of performance in downstream process equipment. One proposed approach to handle a filter element failure is to install a small filter screen in each primary filter element so that if an element fails, the solids plug the screen, thereby avoiding a large loss of catalyst into the downstream piping and equipment. However, this approach does not protect against a coupling or piping failure inside the reactor. In addition, the screen is in the flow path for the backwash so it may diminish the effectiveness of the backwash operation. Finally, the screen would not be accessible for maintenance during operation.

Thus, there remains a need for a filtration system for slurry reactors that improves the effectiveness of backflushing multiple filters and that provides failure detection and protection to downstream equipment from potential mechanical failure of a filter element or piping within the slurry reactor.

SUMMARY OF THE INVENTION

The present invention provides a filter system for use with a three-phase slurry reactor. The filter system comprises one or more bundles of a plurality of filter elements for separating liquid from a mixture of liquid and solid in the reactor. Each bundle of filter elements is operably connected to a fluid collection conduit by means of one or more plenums. The fluid collection conduit of each bundle is connected to a transfer conduit passing to the exterior of the reactor for removal of separated liquid from the reactor for transport to a downstream location. Each transfer conduit is operably connected to a means for backflushing the filter elements. Also each transfer conduit is provided with a guard filter. The guard filter operates as a failure detection device as well as protection to downstream equipment in the event that any of the filter elements fail.

BRIEF DESCRIPTION OF THE DRAWINGS

FIG. 2 is a schematic diagram of a filter bundle suitable for use in the system of the invention.

DETAILED DESCRIPTION OF THE INVENTION

Figure 1:
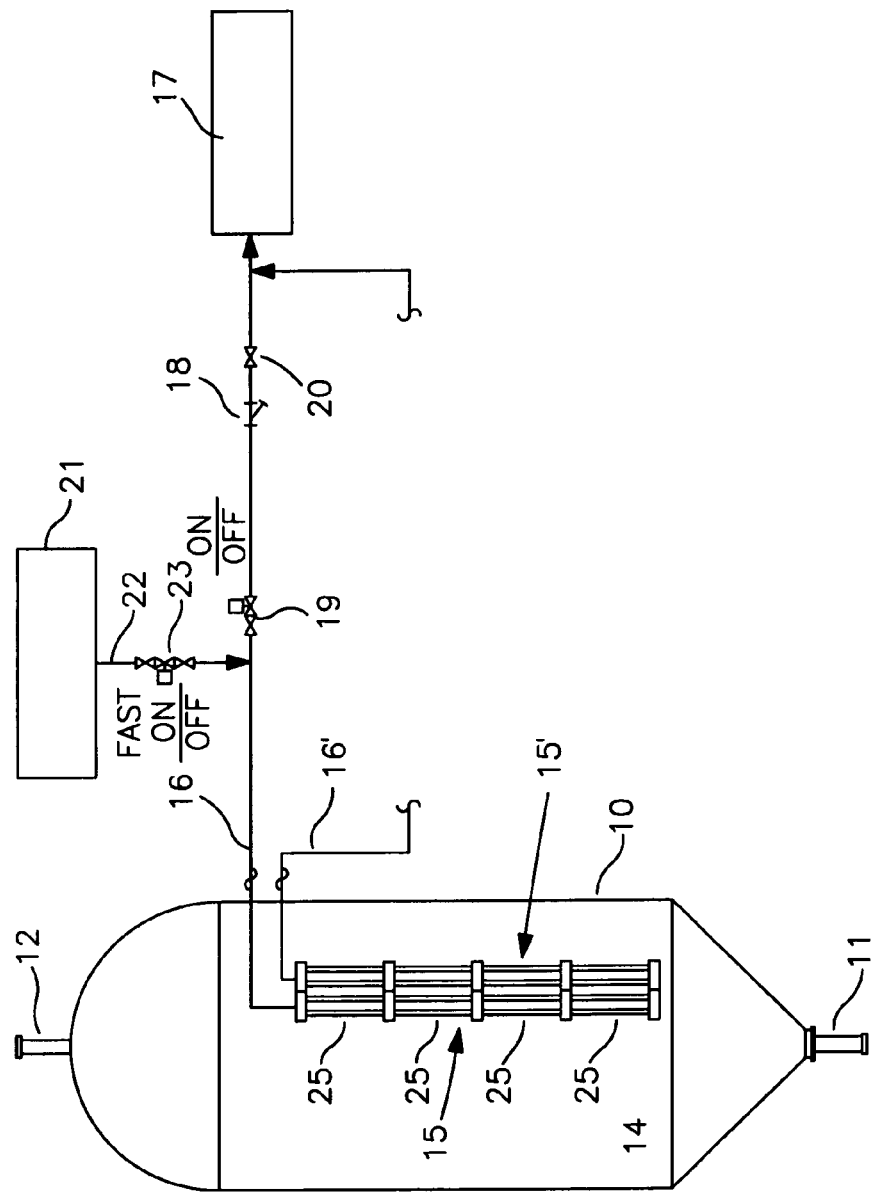
FIG. 1 is a schematic diagram of a slurry reactor filtration system according to the invention.

The filtration system of the invention is particularly suitable for use in any three-phase slurry reactor. For convenience, however, the invention will be described by specific reference to a Fischer-Tropsch (F-T) three-phase slurry hydrocarbon synthesis (HCS) process.

In an F-T slurry HCS process, a synthesis gas comprising a mixture of H2 and CO is bubbled up into a reactor slurry in which it is catalytically converted primarily into liquid hydrocarbons. The mole ratio of H2 to CO may range from about 0.5 to 4, but more typically it is within the range of about 0.7 to about 2.5. The slurry liquid in the reactor comprises the hydrocarbon products of the HCS process which are liquid at reaction conditions.

The temperature and pressure in the slurry can vary widely depending on the particular catalyst used and products desired. Typical conditions effective to form mostly C5-C200 paraffins using a cobalt-containing catalyst include, for example, temperatures, pressures and hourly gas velocities in the range of from about 320° F. to about 600° F. (160° C. to 315° C.), 80 to 600 psi (5.4 to 41 bar-g), and 100 to 40,000

V/hr/V, expressed as standard volumes of the gaseous CO and H2 mixture (0° C., 1 atm) per hour per volume of catalyst respectively.

Typically, the slurry contains from about 10 wt % to about 70 wt % catalyst solids and more typically from 30 wt % to 60 wt % catalyst solids based on the total weight of the liquid and catalyst solids. The size of the catalyst solids may range from 1 to as large as 200 microns in size. Typically, a catalyst comprising cobalt composited with or supported on titania will have a mean particle size of about 60 microns.

In order to maintain steady state conditions in the reactor, the inventory of catalyst in the reactor needs to be kept constant, and liquid products need to be removed at a rate equal to the rate of production. The filtering system of the present invention is particularly suitable for effectively separating liquid product from catalyst particles and removing the separated liquid from the liquid slurry reactor.

Referring now to FIG. 1, a three-phase slurry HCS reactor 10 is provided with inlet 11 for the introduction of synthesis gas and with an outlet 12 for removal of vapors. For convenience, only two filter bundles 15 and 15' are shown, each having a plurality of filter elements 25. The actual number of filter bundles may vary depending upon the reactor geometry, production rate, design filter flux and desired run length. In a typical design, there may be 10 to 60 filter bundles per reactor, with each bundle containing 10 to 60 filter elements.

Liquid hydrocarbon products 14 are separated from catalyst particles (not shown) in reactor 10 by means of the filter elements 25 of the filter bundles.

Each filter bundle, 15 and 15' for example, is connected to a transfer conduit shown as 16 and 16' for the transport of separated liquid products, hereinafter the filtrate, for transport of the filtrate to a downstream location designated generally as 17. The downstream location may comprise processing equipment for upgrading the product, storage vessels, or the like. Each filtrate conduit (see conduit 16) is provided with a guard filter 18 in the conduit which is positioned between two valves 19 and 20 respectively. Valve 19 serves to control the time and rate of removal of filtrate via conduit 16, and valves 19 and 20 permit the isolation of guard filter 18 should the removal and maintenance of that filter be required. The rate of removal of product from reactor 10 is controlled by adjusting valve(s) 19 to balance the liquid production rate. Flow rate for each conduit and group of filter bundles is controlled so that each filter bundle runs at the same removal flux, avoiding large imbalances of flow which could accelerate filter fouling and reduce filter life.

As shown, a source of backflushing fluid (21) is operably connected via a conduit (22) and valve (23) to each filtrate conduit (see conduit 16) between the filter element and valve 19.

The filter elements 25 contained in each filter bundle (15, 15') may be composed of any material designed to withstand the elevated temperature and pressure levels experienced in the reactor environments, including porous sintered metal, wire-wound filter or other type of the prior art. In a preferred embodiment shown in FIG. 2, the filter bundle 15 comprises plenums 24 with a plurality of vertically disposed, elongated filter elements 25 which are joined to the plenums 24. Filter elements 25 are hollow and open into plenums 24. The plenums 24 are connected by filtration collection conduits 28 and ultimately to filtrate removal conduit 16. The filter elements 25 are pervious to the passage of slurry fluid but impervious to the passage of catalyst solids. The filter surface of the filter elements 25 may be fabricated of spirally wound or straight wire wedge or the like. However, it is preferred that the filter elements 25 be fabricated of sintered metal. A key characteristic of sintered metal filters is the effective pore size of the void in the filter, which can be expressed as mean, minimum, and maximum pore sizes. The pore sizes can be determined by a number of methods, such as ASTM-E1294. The selection of element pore size will depend on the particle size of the solids being removed. For example, for solids with a mean particle diameter of 60 um, and a particle size range of 20-120 um, it is preferred that filter elements 25 have a mean pore size in the range of about 0.2 to 5 microns and more preferably in the range of about 0.2 to 2 microns. Experience has shown that a filter member having a mean pore size of 0.5 microns will provide a liquid filtrate essentially totally free of solids when used to remove liquid from a slurry containing a Fischer-Tropsch catalyst having a is particle size distribution of about 20-120 microns.

Referring again to FIG. 1, liquid product is separated from catalyst solids by filter elements in bundle 15, and with valves 19 and 20 open, is transported via conduit 16 to the downstream location 17. When flow through a filter bundle 15 becomes restricted, it will be necessary to remove catalyst solids from the outside of the filter members 25. To clear the filter, valve 19 is closed and quick-opening valve 23 is pulsed, permitting the flow of backflushing fluid from source 21 to flow back through the filter into the reactor, thereby dislodging the solids accumulated on the filter members 25.

The backflushing liquid may be a pressurized gas or a clean liquid. In a preferred embodiment, the backflushing liquid is a portion of the clean product filtrate collected via filtrate removal conduit 16.

Additionally, as shown in FIG. 1, a guard filter 18 is provided in each filtrate removal conduit 16 to detect filter or piping failure and to protect downstream equipment against a sudden release of catalyst solids from the reactor should a filter member or piping connection within the reactor 10 fail. Each guard filter 18 will preferably include means to measure the pressure drop across the guard filter, such as a differential pressure transmitter.

In the practice of the present invention, the mean pore size of guard filter 18 will be from about 0.25 to about 2 times the mean particle diameter of the catalyst particles in the reactor slurry. For example, for a slurry containing a Fischer-Tropsch catalyst having a mean particle diameter of 60 um, the preferred mean pore diameter of the guard filter is 15 to 120 um. Stated differently, the guard filter 18 will have an average pore diameter of about 100 times the pore diameter of the filter elements.

The filtration system of the present invention, in addition of having the advantages herein before set out, also has other advantages, such as:

(1) The small pore size filter member means that substantially solid free filtrate is produced. The guard filter is designed with large pores, thereby minimizing the guard filter area that must be provided and reducing the long-term accumulation of trace solids in the guard filter.

(2) The provision of small pore filter elements and large pore guard filters permits a cost effective method to provide guard filters for severe upsets in multiple parallel product withdrawal lines.

(3) The invention optimizes the piping layout to improve backflush effectiveness by using multiple isolatable connections while installing guard filters within the same piping.

(4) The use of multiple filter bundles and multiple parallel product lines provides for robustness of design and allows continuation of reactor operation in the event of plugging or failure of one or more bundles or elements.

Other advantages should be readily apparent to those with ordinary skill in the art.

What is claimed is:

1. In a three-phase slurry process wherein liquid product is separated from catalyst solids by filtration through one or more filter bundles positioned within a slurry reactor wherein each filter bundle comprises a plurality of filter elements and wherein separated liquid product is transported by a product conduit to a downstream location, the improvement comprising:

providing a separate product conduit for each filter bundle positioned within the slurry reactor;

providing a guard filter in each product conduit outside the reactor and before the downstream location for detecting a failure of a filter element and for protecting downstream equipment in the event of a filter element failure said guard filter including means to measure the pressure drop across the guard filter;

providing valve means in each product conduit for optionally isolating the filter bundle or the guard filter; and providing backflushing means for each product conduit for backflushing the filter elements when required.

2. The improvement of claim 1 wherein each filter element comprises sintered metal filter members having a pore size of from about 0.5 to about 5 microns and each guard filter has a mean pore diameter of about 0.25 to 2 times the mean particle diameter of the slurry solids.

3. A method for separating a liquid hydrocarbon product from catalyst solids in a Fischer-Tropsch slurry bed reactor for transport to a point outside of and downstream from said reactor, the method comprising:

(a) providing one or more filter bundles within said reactor comprising a plurality of filter elements that are pervious to liquid product and impervious to catalyst solids wherein the filter elements of each filter bundle are operably connected to a fluid collection conduit by means of one or more plenums and each collection conduit is connected to a product transfer conduit in communication with a point outside of and downstream from said reactor;

guard filter means in each of said product conduits at a location outside of said reactor, said guard filter means having a mean pore diameter of 0.25 to 2 times the mean particle diameter of the slurry solids;

(b) passing a portion of the slurry liquid phase through the filter elements and into said product conduits, thereby separating liquid product from catalyst solids; and (c) transporting separated liquid product in said product conduits through said guard filters to said point.

4. The method of claim 3 wherein said filter media have a mean pore diameter in the range of about 0.5 to about 5 microns.

5. The method of claim 4 wherein each product conduit is provided with a backflushing fluid inlet and where the flow of product liquid from any one of the filter bundles decreases to a predetermined rate, (a) stopping the passing of liquid through that filter bundle;

(b) introducing backflushing fluid through the backflushing fluid inlet so as to dislodge catalyst solids on the filter elements;

(c) stopping the introduction of the backflushing fluid; and (d) resuming passage of fluid through the filter bundle.

6. The method of claim 5 wherein the backflushing fluid introduced in step (b) is introduced in a pulsed manner.

7. A method for protecting downstream processing equipment from solids contamination resulting from potential failure of any one of a plurality of filter bundles positioned within a three-phase slurry reactor, the method comprising:

providing each of said filter bundles positioned within the slurry reactor with a separate isolatable conduit for transport of liquid product passing through the filter elements to downstream processing equipment; and providing each of said conduits with a guard filter at a location outside of the slurry reactor whereby said guard filter will protect downstream equipment in the event of a failure of a filter element.

\* \* \* \* \*